(12) United States Patent
de Graffenried, Sr.

(10) Patent No.: US 10,787,362 B2
(45) Date of Patent: Sep. 29, 2020

(54) HYDROGEN CO-FIRING WITH CARBON PRE-CAPTURE FOR HIGHER CARBON RATIO FOSSIL FUELS

(71) Applicant: Christopher L. de Graffenried, Sr., Mahopac, NY (US)

(72) Inventor: Christopher L. de Graffenried, Sr., Mahopac, NY (US)

( * ) Notice: Subject to any disclaimer, the term of this patent is extended or adjusted under 35 U.S.C. 154(b) by 0 days.

(21) Appl. No.: 15/596,537

(22) Filed: May 16, 2017

(65) Prior Publication Data

US 2017/0327373 A1 Nov. 16, 2017

Related U.S. Application Data

(60) Provisional application No. 62/336,980, filed on May 16, 2016.

(51) Int. Cl.
 *C01B 3/24* (2006.01)
 *C10K 1/02* (2006.01)
 (Continued)

(52) U.S. Cl.
 CPC ............ *C01B 3/24* (2013.01); *B01J 19/088* (2013.01); *C10G 15/12* (2013.01); *C10K 1/024* (2013.01); *F23G 5/008* (2013.01); *F23G 5/12* (2013.01); *B01J 2219/0875* (2013.01); *C01B 2203/0272* (2013.01); *C01B 2203/0861* (2013.01);
 (Continued)

(58) Field of Classification Search
 CPC ........ C01B 2203/0861; C01B 2203/04; C01B 2203/0475; C01B 32/50; C10K 1/024; B01D 2257/504; C10L 3/104; Y02C 10/04; Y02C 10/06; Y02C 10/08; Y02C 10/10; Y02C 10/02; Y02C 10/12; Y02C 10/14; Y02A 50/2342
 See application file for complete search history.

(56) References Cited

U.S. PATENT DOCUMENTS 8,127,556 B2 3/2012 Aiton et al.
8,163,041 B1 4/2012 Bezis et al.
(Continued)

FOREIGN PATENT DOCUMENTS

WO 2008113061 9/2008
WO 2012145755 10/2012

OTHER PUBLICATIONS

"Nebraska Public Power District to implement innovative solution, curbs carbon emissions while growing economy." Nebraska Public Power District, Apr. 17, 2015, www.nppd.com/2015/nebraska-public-power-district-implement-innovative-solution-curbs-carbon-emissions-growing-economy/. Accessed Aug. 29, 2017.

*Primary Examiner* — Imran Akram
(74) *Attorney, Agent, or Firm* — Gearhart Law LLC

(57) ABSTRACT

An apparatus is disclosed for the pre-capture of carbon from natural gas and/or other light gaseous hydrocarbons and oils, and for co-firing the resulting hydrogen and any remaining hydrocarbons with higher carbon ratio fuels, such as coal and heavy oils and even lower carbon ratio natural gas, in a steam electric generator and/or other boilers, processes, reactors, power plants, engines and combustion turbines, and combined cycle units, to reduce their carbon dioxide production and emissions to the environment, and for co-processing the syngas with other feed materials to react them in a separate vessel and produce a desired outcome.

14 Claims, 4 Drawing Sheets

(51) Int. Cl.
    *B01J 19/08*     (2006.01)
    *F23G 5/00*     (2006.01)
    *F23G 5/12*     (2006.01)
    *C01B 3/56*     (2006.01)
    *C10G 15/12*     (2006.01)

(52) U.S. Cl.
    CPC .. *C01B 2203/1241* (2013.01); *C01B 2203/86* (2013.01); *C10G 2300/4043* (2013.01); *Y02P 30/446* (2015.11)

(56) References Cited

U.S. PATENT DOCUMENTS

| | | |
|---|---|---|
| 8,337,613 B2 | 12/2012 | Zauderer |
| 8,828,105 B2 | 9/2014 | Calabrese et al. |
| 9,005,536 B1* | 4/2015 | Rogers ............ C05F 3/02 422/186.21 |
| 2003/0024806 A1* | 2/2003 | Foret ............ B01J 19/126 204/164 |
| 2008/0202985 A1 | 8/2008 | Hatfield et al. |
| 2009/0099004 A1* | 4/2009 | Henderson ............ B01J 19/088 502/21 |
| 2010/0266908 A1* | 10/2010 | de Graffenried, Sr. ............ C01B 3/342 429/416 |
| 2011/0158858 A1* | 6/2011 | Alves Ramalho Gomes ............ C01B 3/042 422/187 |
| 2013/0131199 A1* | 5/2013 | Lien ............ B01D 53/22 518/702 |
| 2013/0326953 A1 | 12/2013 | Kim et al. |
| 2014/0196370 A1 | 7/2014 | Juranitch et al. |
| 2014/0272639 A1* | 9/2014 | Zietlow ............ H01M 8/0656 429/418 |
| 2014/0332724 A1* | 11/2014 | Tsangaris ............ C10J 3/726 252/373 |

* cited by examiner

HYDROGEN CO-FIRING WITH CARBON PRE-CAPTURE FOR HIGHER CARBON RATIO FOSSIL FUELS

CLAIM OF PRIORITY

This application claims priority to U.S. Application 62/336,980 filed on May 16, 2016, the contents of which is fully incorporated by reference in its entirety.

FIELD OF THE EMBODIMENTS

This field of the embodiments of the present invention relate to apparatus, methods, processes, and designs for the production of a synthetically manufactured gas mixture substantially comprising hydrogen ("h-syngas" or "syngas") for co-firing with higher-carbon ratio fossil fuels, such as coal and heavy oils, or even with low-carbon ratio natural gas, in various processes, reactors, power plants, vessels, engines and combustion turbines, and combined cycle units, to reduce overall carbon dioxide emissions to the environment and for other uses requiring a low-carbon, high-hydrogen source, such as co-processing with a heavy oil as part of a hydrogenation process.

BACKGROUND OF THE EMBODIMENTS

Many believe that the burning of carbon-containing fossil fuels by humankind has contributed materially to global warming. Plants have, for millions of years, combined chlorophyll, water and sunlight to convert atmospheric carbon in the form of carbon-dioxide ($CO_2$) into hydrocarbons and, along with geologic processes, have sequestered this carbon in various carbon-bearing deposits, e.g., coal seams.

The burning of these carbon-rich deposits by humankind has in effect reversed in only a few hundred years the natural sequestrating of billions of tons of carbon that had occurred over tens of millions of years, materially altering the natural carbon cycle and the environment. The re-release of large quantities of naturally sequestered carbon, specifically its release into the atmosphere as $CO_2$, has disturbed the global environment, and may be turning the Earth's environmental clock back to a time and to conditions that predate, and could be hostile to the development, of humankind.

$CO_2$ is one of a group of potent greenhouse gases. Their release has contributed to recent changes, and is projected to contribute to undesirable future changes in global temperature, weather and the carbon cycle; in other words the "greenhouse effect." To limit, and even reverse the effects of greenhouse gases on the planet, it is highly desirable for humankind to reduce, that is, to limit future production and release of $CO_2$ into the environment.

The present disclosure intends to promote embodiments covering methods and apparatus for co-firing predominantly or substantially hydrogen-based syngas with higher carbon ratio fossil fuels, such as coal and heavy oils, so as to limit the production of $CO_2$ and its release of into the environment. This approach reduces the total release of previously sequestered carbon as $CO_2$, and also produces a commercially valuable by-product of solid carbon soot (SCS).

Further, it is believed that the burning and capture, compression, storage, transport and re-sequestering of carbon as $CO_2$, known as carbon capture and storage (CCS), is far less desirable. This is because CCS is overly expensive, fails to preserve existing boiler infrastructure investment value, and is likely to be less economical when all the external environmental risks and consequences are considered. CCS is also technically, geologically, socially and/or politically infeasible for a wide range of applications.

In partial recognition of the negative effects of $CO_2$ release on the environment, some have called for the development of a hydrogen economy. A number of different hydrogen economies may be envisioned using hydrogen in various ways. However, to achieve this vision, there is a pressing need to find sources of hydrogen that do not also result in the production and release of substantial additional quantities of $CO_2$ into the environment. To minimize the impact of the hydrogen economy on the environment, alternative safe, clean and environmentally acceptable sources of hydrogen, and processes for extracting and using the hydrogen from these resources, must be developed and employed worldwide.

The environmental perspective of the disclosed inventions is that the carbon in the starting material should be a by-product. The negative impact of $CO_2$ release on the environment makes it a by-product. It is envisioned that unburned carbon, substantially separated as solid carbon soot, will be sold, displacing other carbon soot production, stored, and/or re-sequestered as a solid to minimize its re-release to the environment. For example, this may be accomplished by returning the processed solid carbon soot to the underground deposits from which the high carbon ratio fossil fuel, such as coal or heavy oils, was originally produced.

REVIEW OF RELATED TECHNOLOGY

U.S. Pat. No. 8,828,105 pertains to engineered fuel feed stocks and methods of making the fuel feed stocks. Components derived from processed waste streams can be used to make such feed stocks which are substantially free of glass, metals, grit and noncombustibles. These feed stocks are useful for a variety of purposes including co-firing with coal and as substitutes for coal. However, the patent shows predicted $H_2$+CO production for all feed stocks. The presence of substantial carbon monoxide (CO) in the syngas results in the production and release of substantial carbon dioxide ($CO_2$) to the environment, which is avoided by the present invention.

U.S. Patent Application 2014/0196370 pertains to a method of generating a blended syngas as a primary product from renewable feedstock, fossil fuels, or hazardous waste with the use of a gasifier arrangement. The generated syngas is blended with natural gas to form a blended fuel product that is delivered to a manufacturing facility or a natural gas power plant.

U.S. Patent Application 2013/0326953 pertains to a gasification method of a carbon-containing material, the method including: (a) reacting a carbon-containing material to be treated under the presence of a catalyst with steam to produce a syngas containing hydrogen, carbon monoxide and carbon dioxide; (b) generating a carbon dioxide rich gas by introducing a portion of the syngas that has produced in step (a) into a combustion process, and/or separating hydrogen and carbon monoxide from the syngas produced in step (a); and (c) recycling, to step (a), the carbon dioxide rich gas that has been produced in step (b). By the method, the necessity of separating or collecting and storing carbon dioxide for reducing carbon dioxide is eliminated to minimize costs for constructing a special device and facility for the separation or collecting and storage of the carbon dioxide. However, the presence of substantial carbon monoxide (CO) in the syngas results in the production and release of substantial carbon dioxide ($CO_2$) to the environment, which is avoided by the present invention.

Various devices are known in the art. However, their structure and means of operation are substantially different from the present disclosure. The other inventions fail to solve all the problems taught by the present disclosure. At least one embodiment of this invention is presented in the drawings below and will be described in more detail herein.

SUMMARY OF THE EMBODIMENTS

In general, the present invention and its embodiments provide for lower cost electricity to be produced with lower $CO_2$ emissions by co-firing H-syngas and higher carbon ratio fossil fuels, such as coal and heavy oils, or even, in some embodiments, with low-carbon ratio fossil fuels such as natural gas. This objective may be achieved in several steps.

First, a starting material, such as natural gas, may be decompressed and pre-heated. Coal or oil may also be processed into a starting material. Then the starting material may flow into a decomposition reactor for dissociation into its elemental carbon and hydrogen components. In the preferred embodiment, the starting material is introduced into a decomposition reactor using a plasma array apparatus (PAA), but other means may also be used.

The decomposition reactor is intended to be capable of withstanding the flows, temperatures, and pressures necessary for the required starting material decomposition. The decomposition reactor is preferably fed starting materials through one or more PAA's and/or separate inlets.

The decomposition reactor may further contain instrumentation for process monitoring and control, and one of more outlets for gasses, such as hydrogen and any remaining light hydrocarbons, and one or more outlets for solid carbon soot and any other solid by-products.

Upon exiting the decomposition reactor the gaseous mixture is directed to an optional filtering vessel, where entrained solid carbon soot suspended in the gas flow is filtered out. For example, a cyclone filter may be used to achieve such filtering. The "cleaned" or filtered syngas mixture, which is now composed of at least hydrogen and any residual light hydrocarbon gases, can then be directed to at least one of its intended uses. In other embodiments, other filtering structures and methodologies may be employed under the purview of the present application.

In one embodiment, the syngas is directed to a boiler to be co-fired with a higher carbon ratio fossil fuel, thereby reducing the boiler's overall production and release of $CO_2$ to the environment. The solid carbon soot by-product may then be processed to be sold, stored for future use, and/or re-sequestered.

In another embodiment of the present invention there is an apparatus for reducing carbon dioxide emissions through co-firing, the apparatus having a mounting surface 105; a feed material module coupled to the mounting surface 105; a decomposition module coupled to the feed material module, the decomposition module containing one or more plasma sources configured to decompose a feed material into a product; a filter module configured to separate entrained solid carbon soot from the product; a mixing module where the product is mixed with fossil fuels; and a carbon disposal module configured to receive solid carbon soot.

In another embodiment of the present invention there is an apparatus for reducing carbon dioxide emissions through co-firing, the apparatus having a mounting surface 105, wherein the mounting surface 105 is mobile or fixed; a feed material module coupled to the mounting surface 105, the feed material module being configured to regulate at least a pressure, a temperature, and a flow rate of a feed material; a decomposition module operationally coupled to the feed material module, the decomposition module containing a reactor vessel and one or more plasma sources configured to decompose the feed material via plasma pyrolysis generating a syngas; a filter module configured to separate entrained solid carbon soot from the syngas; a mixing module configured to mix the product with a higher carbon ratio fossil fuel; and a carbon disposal module configured to receive the solid carbon soot from the syngas. The filter module may further comprise a porous solid particle separator.

In yet another embodiment of the present invention there is a method of reducing carbon dioxide emissions comprising the steps of: treating a starting material, the starting material containing saturated or unsaturated hydrocarbon chains; introducing the starting material into a decomposition module thereby forming a decomposed gaseous product, the decomposed gaseous product comprising hydrogen, wherein the decomposition module contains one or more plasma sources configured to decompose the starting material via plasma pyrolysis generating a syngas; extracting carbon from the decomposed gaseous product forming a syngas; and co-firing the syngas with at least one carbon containing fuel. In general, the present invention succeeds in conferring the following, and other not mentioned, benefits and objectives.

It is an object of the present invention to provide a system that reduces carbon dioxide emissions to the environment.

It is an object of the present invention to provide a system that creates solid carbon soot as a byproduct.

It is an object of the present invention to provide a system that allows for co-firing of H-syngas with a higher carbon ratio fossil fuel.

It is an object of the present invention to provide a system that reduces environmental pollution and damage from the emission of carbon dioxide among other harmful combustion-related waste products.

It is an object of the present invention to provide a system that permits customized control over the system.

It is an object of the present invention to provide a system that creates a hydrogen containing synthetic gas or syngas.

DESCRIPTION OF THE PREFERRED EMBODIMENTS

Figure 1:
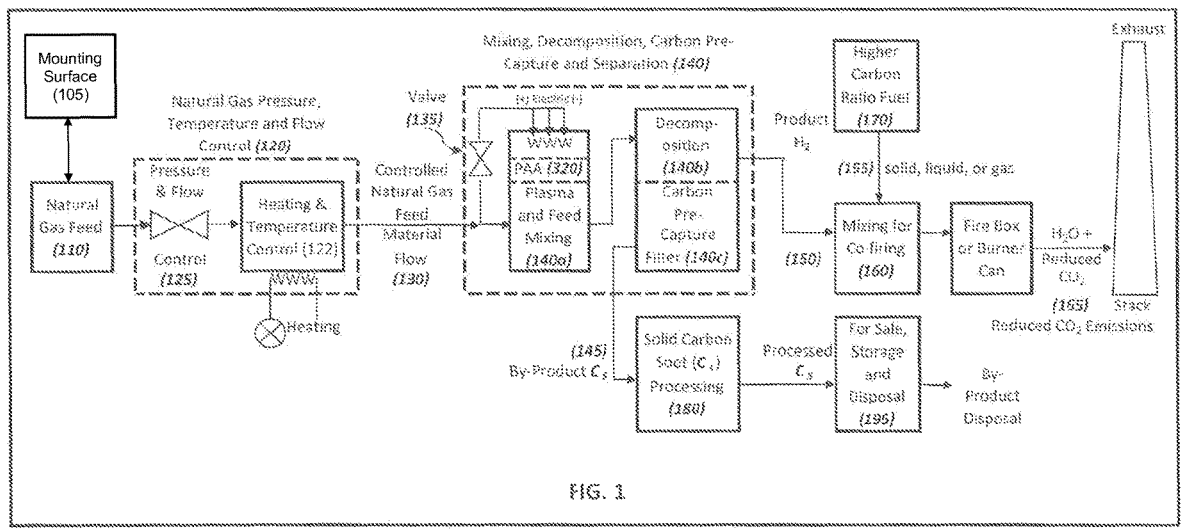
FIG. 1 is a flowchart illustrating an overall system process associated with an embodiment of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Referring now to FIG. 1, there is a flow chart illustrating an embodiment of the present invention. In a preferred embodiment, the present invention begins with a natural gas source 110. The natural gas source 110 may primarily comprise methane, but may comprise other compounds and/or impurities therein.

The natural gas source 110 may be regulated by a natural gas pressure, temperature, and flow control module 120. This module 120 enables a user or a machine algorithm the ability to influence various parameters associated with the natural gas including but not limited to pressure, temperature, and flow control or rate via the system controls 190. Other parameters may include the ability to add additives to the natural or otherwise modify the natural gas in some respect. The natural gas may then be transported, in step 130, to the decomposition, carbon pre-capture, and separation module 140.

This decomposition module 140 utilizes plasma pyrolysis to decompose the natural gas into its elemental constituents, primarily carbon and hydrogen. The carbon may be captured, as shown in step 145, to provide for preparation of a solid carbon soot by-product 180. In the preferred embodiment, the natural gas is introduced into the decomposition module 140 embodied as a decomposition reactor using a plasma array apparatus (PAA) 320, as shown in FIG. 3, or other means capable of causing decomposition of the natural gas.

Figure 3:
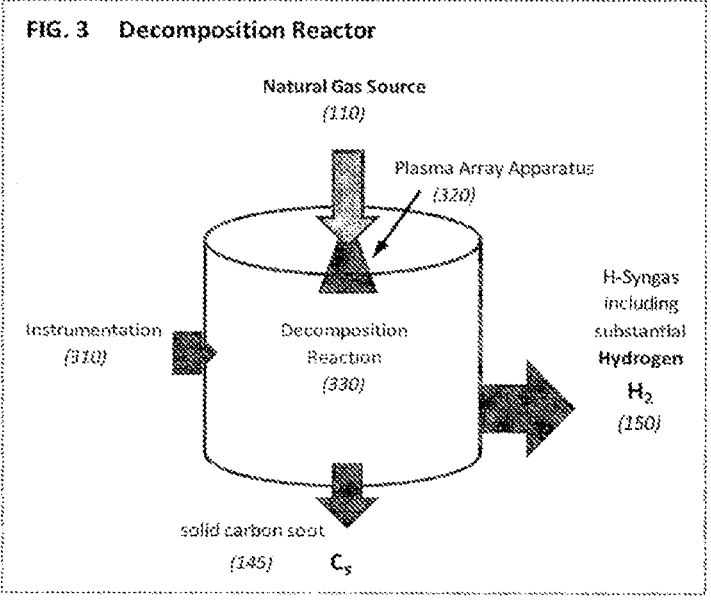
FIG. 3 is a schematic illustrating a decomposition reactor in accordance with an embodiment of the present invention.

Referring now to FIG. 3, in some embodiments, the decomposition reactor 330 is capable of withstanding the flows, temperatures, and pressures necessary for the required starting material decomposition. In a preferred embodiment, the decomposition reactor 330 is fed starting materials, such as natural gas, through one or more PAA's 320 comprising one or more separate inlets. In other embodiments, the decomposition reactor 330 contains instrumentation 310 for process monitoring and control, and one of more outlets for gasses, such as hydrogen and any remaining light hydrocarbons (together hydrogen syngas) 150, and one or more outlets for solid carbon soot 145, as described above.

The PAA 320 may be formed from any number of plasma sheets or other arrangement of plasmas to create a plasma reacting region. This plasma reacting region is located within the interior of the decomposition reactor 330 and allows for increased reaction time for the starting materials thereby providing more complete decomposition, the ability to maintain more uniform temperatures within the decomposition reactor 330, and the ability to handle higher rates of introduction of feed material, such as natural gas 110, into the decomposition reactor 330. Further embodiments of the decomposition reactor 330 and PAA 320 may be described in U.S. patent application Ser. No. 12/426,266 (now U.S. Pat. No. 9,212,058) and Ser. No. 12/106,488 (now U.S. Pat. No. 9,284,503), the contents of both of which are herein fully incorporated by reference.

The generated syngas or h-syngas or hydrogen syngas 150 may comprise substantially (equal to or more than 50%) hydrogen and is preferably introduced into another reaction area, such as a boiler, for co-firing with a fossil fuel or other hydrocarbon based fuel 170. In other embodiments, the generated syngas 150 may comprise at least 20% hydrogen and more preferably may be between about 25% and about 99% hydrogen. In a preferred embodiment, the syngas contains at least 40% hydrogen. In some embodiments, the higher carbon ratio fossil fuel is a heavy oil or coal. In other embodiments the H-syngas may be co-fired with a biofuel, such as wood chips or corn stovers, or the H-syngas may be co-fired with a recycled product, such as shredded tires, which are predominantly carbon black. Other bio-oils may include but are not limited to bio-diesel, bio-gasoline, bio-gas, ethanol, bio-coke or bio-coal and the like or some combination thereof. In other embodiments, various waste products including municipal wastes may be co-fired with the syngas.

As shown below, the ratio of carbon to hydrogen affects the energy content and the $CO_2$ released by the combustion of the chosen fuel (see Table 1). By co-firing the fuel with the H-syngas created as described herein, the amount of $CO_2$ generated by combustion of the fossil fuel can be greatly reduced thereby reducing the greenhouse gasses emitted into the atmosphere, as shown in FIG. 1, step 165. Co-firing coal with syngas can reduce the resulting $CO_2$ emissions from a coal-fired plant to the much lower level of emissions resulting from burning only natural gas in that plant.

TABLE 1

Increasing the Hydrogen in the Mix Reduces the $CO_2$ Produced and Emitted

| Chemical Formulas | | HHV kJ/kg fuel | Energy/mol kJ/mol fuel | mol $CO_2$/ mol fuel | kg $CO_2$/ kg fuel |
|---|---|---|---|---|---|
| Hydrogen | $H_2$ | 141,000 | 284.2 | 0 | 0.00 |
| Methane | $CH_4$ | 55,530 | 890.8 | 1 | 2.74 |
| Anthracite | $C_xH_y$ | 32,500 | 423.1 | 1 | 3.38 |
| Solid Carbon | $C(s)$ | 34,080 | 409.3 | 1 | 3.66 |
| Carbon Dioxide | $CO_2$ | | | | |
| Hydrogen plus Anthracite | 20% 80% | 54,200 | | | 2.70 |

The ratios, values, and examples shown in the table are intended to be exemplary only and various other fuels may be implemented and co-fired as described herein. Further, the solid carbon soot may be captured, in step 145, and optionally treated or prepared 180. The solid carbon soot may then be sold, stored, disposed of, or otherwise captured for various purposes. However, a premise of the embodiments of the present invention is for solid carbon soot to be captured and not released or burned or otherwise exuded from the apparatus or associated process.

Figure 2:
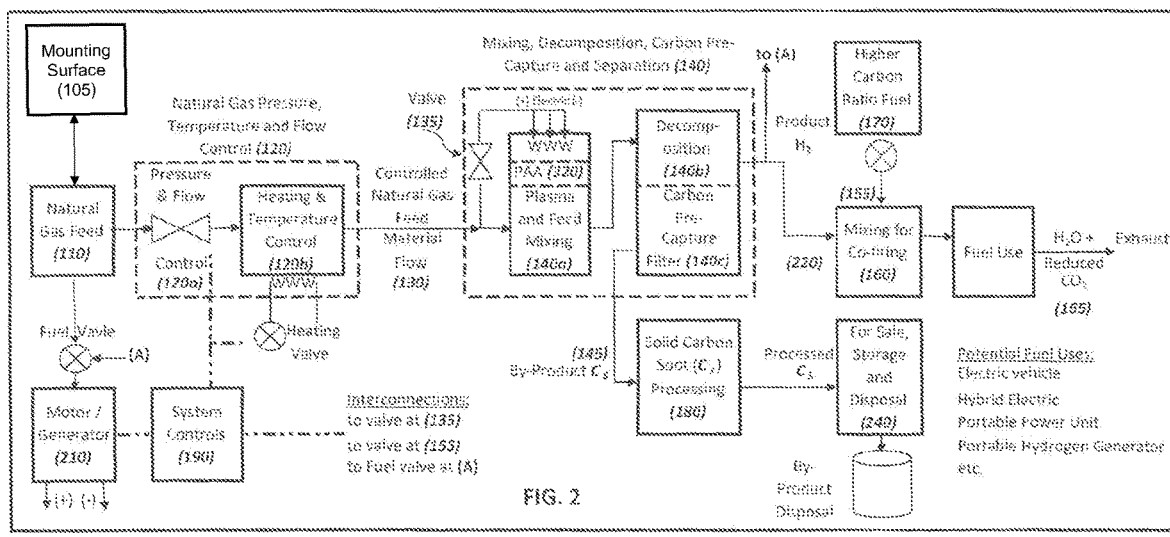
FIG. 2 is a schematic of the major functions contained on a fixed location or mobile H-syngas module.

FIG. 2 demonstrates one potential embodiment of the present invention. Here, the various modules may be coupled to a mobile or fixed platform in an operational or fluid connection to one another. If the platform 230 is a fixed platform, then the location may be in any number of locations such as a waste treatment facility, energy production facility, etc. if the platform 230 is a mobile platform, it is preferable that the platform 230 has wheels or other mechanisms of motion coupled thereto. Further, the platform 230 may be capable of being fully driven or maneuvered or may be on a trailer enabling it to be coupled to the back of a truck or other vehicle configured to tow such a payload.

As shown in FIG. 2, the natural gas source 110 or starting materials are introduced into the natural gas pressure, temperature, and flow control module 120. The module 120 may have one or more inlets for receiving the starting materials. Further, the module 120 may have one or more outlets for introducing the starting materials at a rate, temperature, pressure, etc. selected by the system controls 190 or system control programming to the decomposition module 140.

From the decomposition module 140 the resulting gases to be co-fired may be introduced into a boiler 220 or similar structure for firing with fossil fuels as described herein or may be directly introduced into a fuel cell or power supply unit 210 for providing fuel to an apparatus such as an automobile and/or to power the decomposition module.

The resulting solid carbon soot 180 may optionally be collected and prepared and may be further refined, processed, or otherwise utilized for sale, storage, and/or disposal 240 thereby preventing the carbon for escaping into the atmosphere.

Figure 4:
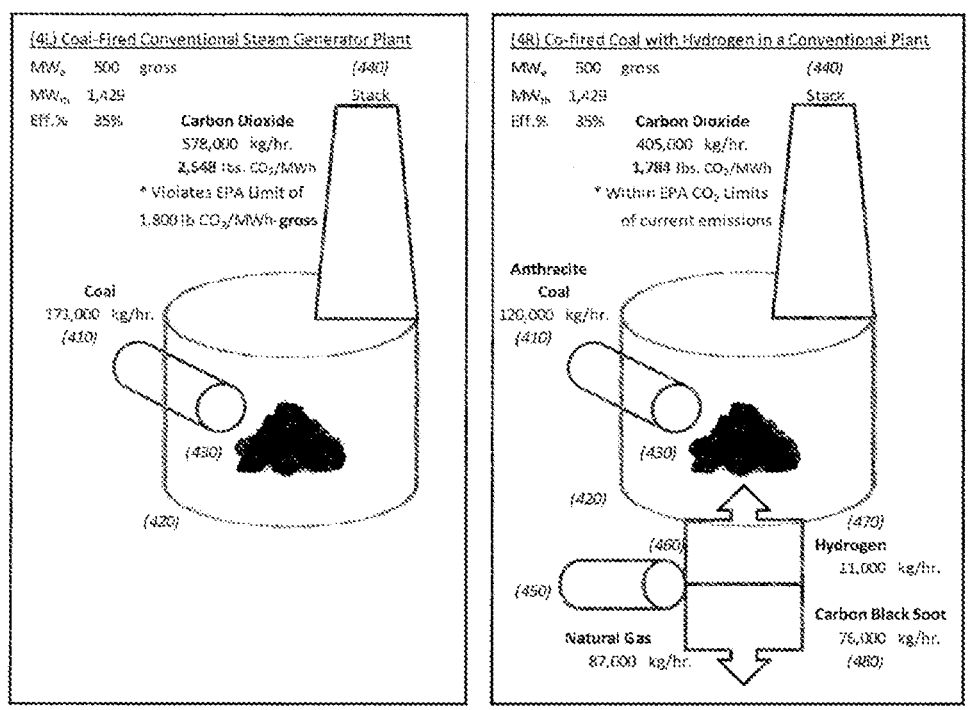
FIG. 4 is an exemplary illustration of two coal-burning power plants: 4L) coal-fired conventional steam generator plant, and 4R) co-fired coal with hydrogen in a conventional plant.

Referring now to FIG. 4, for both left (4L) and right (4R) examples, coal 410 is introduced into the combustion vessel 420, where it is combined with an ignition source and air containing oxygen (not shown), and is burned 430. The resulting combustion gases produced by burning the coal include substantial quantities of the "greenhouse gas" carbon dioxide ($CO_2$). The $CO_2$ is emitted up the stack 440 and into the environment in such a plant design. The values presented here are for exemplary purposes only and may be revised or different for varying load assumptions and actual designs.

In (4L), the emissions from this coal-fired power plant—without the benefit of hydrogen co-firing—substantially exceeds the U.S. Environmental Protection Agency's (EPA's) Clean Power Plan (CPP) cap of 1,800 lbs. of $CO_2$ per megawatt-hour-gross (MWh-gross) for coal-fired power plants.

However, in (4R), elements from embodiments of the present invention have been added to provide the benefits of hydrogen co-firing in reducing $CO_2$ emissions. Additional natural gas 450 is introduced into a thermal decomposition vessel 460 to decompose the feed material into hydrogen 470 and by-product carbon black 480. The hydrogen may then be introduced into the combustion vessel 420, to be co-fired with the coal, where it is burned to form water vapor ($H_2O$), thereby substantially reducing stack 440 $CO_2$ emissions.

The emissions from the power plant benefiting from hydrogen co-firing are below the U.S. Environmental Protection Agency's (EPA's) cap of 1,800 lbs. of $CO_2$ per megawatt-hour-gross (MWh-gross) for modified coal-fired power plants. Such goals are accomplished without the substantial operating efficiency losses and capital investment required for carbon dioxide capture and storage (CCS) infrastructure. None of the following CCS investments are required: no oxygen plant, no $CO_2$ capture chemical plant, no $CO_2$ compression plant, no $CO_2$ storage facilities, or $CO_2$ pipeline, and no $CO_2$ injection network or deep well disposal field.

The modified coal-burning plant, shown in (4R), benefiting from the reduced $CO_2$ emissions associated with hydrogen co-firing, can still use as much as 70% coal as the older design (4L), providing multi-fuel diversity, preserving the value of current capital investments, and avoiding stranded costs associated with "no-longer-used-and-useful" investments and the associated write-downs. Further, the modified plant (4R) fully meets the EPA's CPP coal plant emission standards. This is accomplished with a minimum of incremental capital investment. Finally, the by-product carbon soot produced from thermal decomposition of the natural gas can be sold for a revenue credit against the overall cost of the modified power plant operations.

Although this invention and its embodiments have been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. An apparatus for reducing carbon dioxide emissions, the apparatus comprising:
   a mounting surface;
   a natural gas as a feed material wherein the natural gas has a moisture content of less than 50% moisture content by weight;
   a feed material module coupled to the mounting surface, the feed material module being configured to receive the natural gas as the feed material therein;
   a syngas comprising 50% hydrogen;
   a decomposition module operationally coupled to the feed material module, the decomposition module containing one or more plasma sheets forming a plasma reacting region having a temperature in a range of approximately 800° C. to approximately 5000° C. and a pressure in a range of approximately 0 atmospheres to approximately 100 atmospheres that is configured to decompose the natural gas into the syngas comprising 50% hydrogen;
   a filter module configured to separate entrained at least solid carbon soot from the syngas; and
   a mixing module configured to mix the syngas with at least one fossil fuel.

2. The apparatus of claim 1, further comprising:
   a carbon disposal module configured to receive solid carbon soot from the syngas.

3. The apparatus of claim 2, further comprising a preparation and processing vessel configured to pelletize the solid carbon soot into solid carbon pellets.

4. The apparatus of claim 1, further comprising:
   a system control module configured to supply at least start-up, monitoring and control, operation, load follow, and shutdown of the apparatus.

5. The apparatus of claim 1, wherein the feed material module further comprises:
   a feed material control pipe, the feed material control pipe having one or more inlets and one or more outlets, and feed material flow control, handling, heating and/or processing apparatus.

6. The apparatus of claim 1, wherein the decomposition module comprises one or more inlets for the natural gas and for introducing plasma produced by the one or more plasma sheets.

7. The apparatus of claim 1, wherein the filter module has at least one solid particle filter.

8. The apparatus of claim 1, wherein the mixing module is configured to introduce a higher carbon ratio fossil fuel.

9. The apparatus of claim 1, wherein the moisture content of the natural gas is less than 15% moisture content by weight, and wherein the temperature of the plasma reacting region is in a range of approximately 800° C. to approximately 2500° C.

10. The apparatus of claim 1, wherein the moisture content of the natural gas is less than 5% moisture content by weight, and wherein the temperature of the plasma reacting region is in a range of approximately 800° C. to approximately 2500° C.

11. An apparatus for reducing carbon dioxide emissions, the apparatus comprising:
    a mounting surface, wherein the mounting surface is mobile or fixed;
    a natural gas, wherein the natural gas has a moisture content of less than 50% moisture content by weight;

a natural gas module coupled to the mounting surface, the natural gas module being configured to regulate at least a pressure, a temperature, and a flow rate of the natural gas;

a syngas comprising 50% hydrogen;

a decomposition module operationally coupled to the natural gas module, the decomposition module containing one or more plasma sheets forming a plasma reacting region having a temperature in a range of approximately 800° C. to approximately 5000° C. and a pressure in a range of approximately 0 atmospheres to approximately 100 atmospheres that is configured to decompose the natural gas into the syngas comprising 50% hydrogen via plasma pyrolysis;

a filter module configured to separate entrained at least solid carbon soot from the syngas;

a mixing module configured to mix the syngas with at least one higher carbon ratio fossil fuel; and a carbon disposal module configured to receive the solid carbon soot from the syngas.

12. The apparatus of claim 11, wherein the mounting surface is a trailer bed.

13. The apparatus of claim 11, further comprising:
a preparation and processing vessel configured to pelletize the solid carbon soot into solid carbon pellets.

14. The apparatus of claim 11, wherein the syngas comprises another gas.

* * * * *